Oct. 31, 1933.  G. A. HUMASON  1,933,172
SLIP
Filed Oct. 10, 1932  2 Sheets-Sheet 2
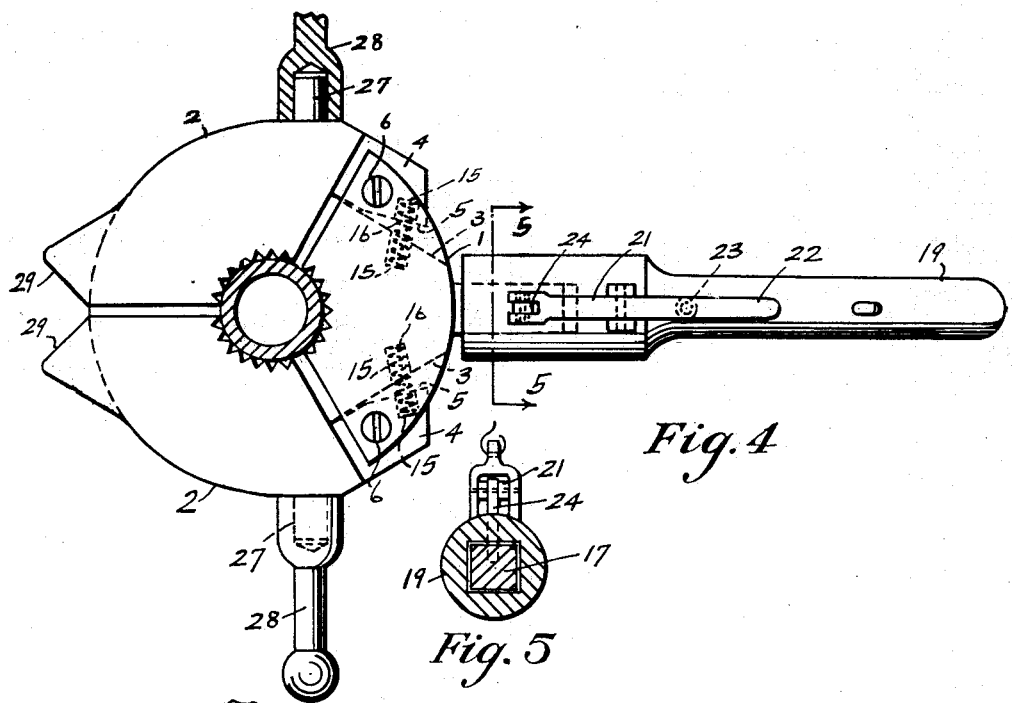
Fig. 4
Fig. 5
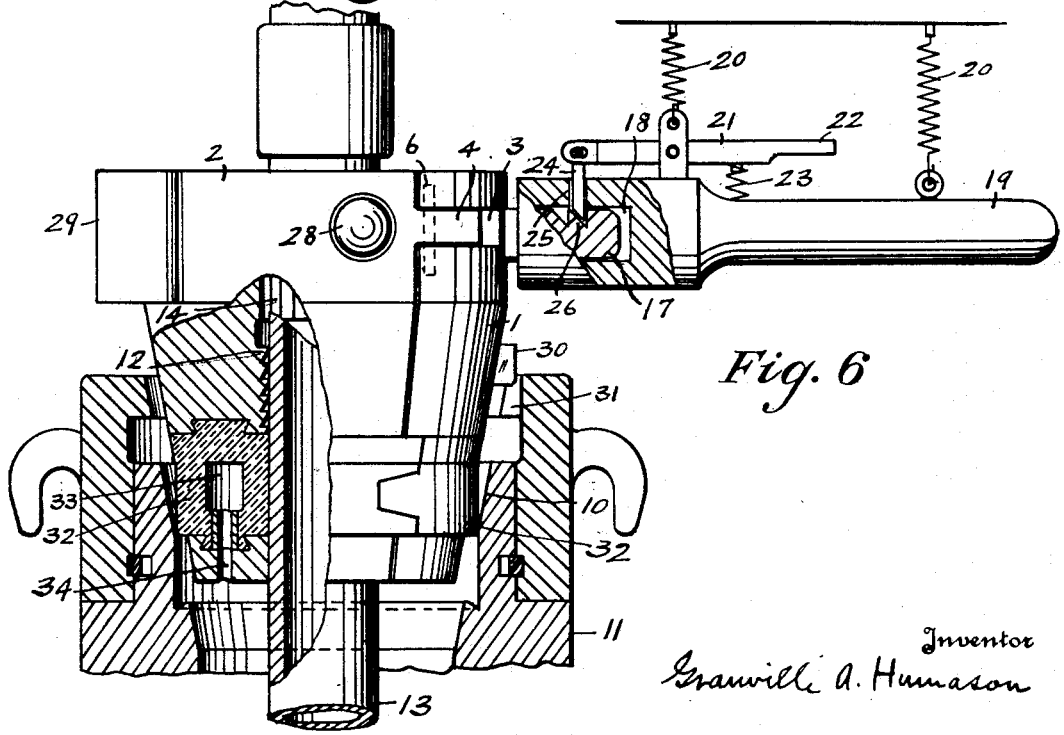
Fig. 6
Inventor
Granville A. Humason
By
Hardway Rathey
Attorneys Patented Oct. 31, 1933

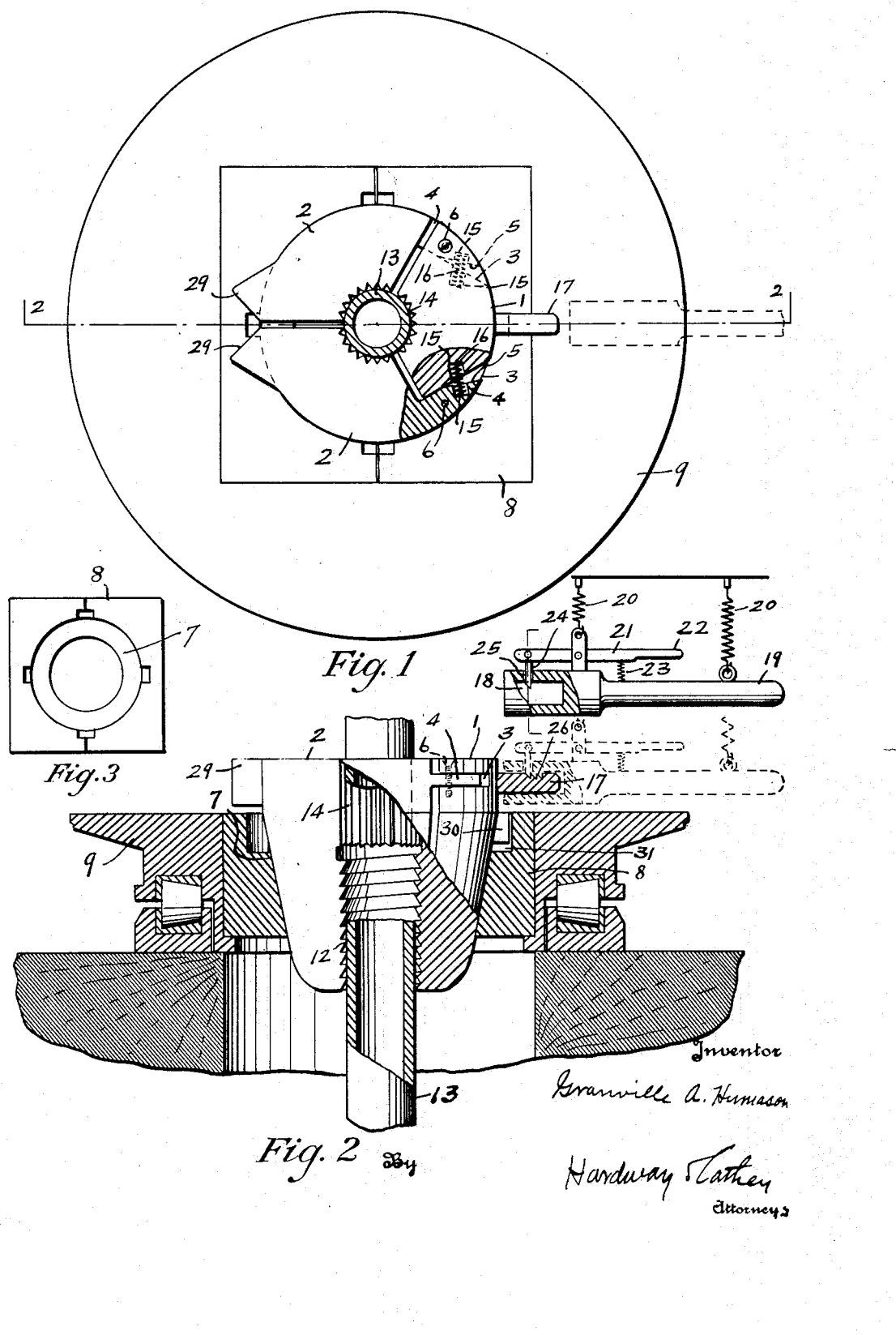

1,933,172

UNITED STATES PATENT OFFICE 1,933,172

SLIP

Granville A. Humason, Houston, Tex.

Application October 10, 1932. Serial No. 636,971

6 Claims. (Cl. 24—263)

This invention relates to a slip.

An object of the invention is to provide a novel type of slip for holding a pipe suspended in a well bore and embodying novel means for connecting the slip segments together.

Another object is to provide a slip of such novel shape as to adapt it to be readily seated in place in the adapter seat around a pipe to be held.

Another object is to provide a slip having means therein for forming a fluid tight joint between it and the adapter seat, or other seat, wherein the slip is mounted.

With the above and other objects in view this invention has particular relation to certain novel features of construction, operation and arrangement of parts an example of which is given in this specification and illustrated in the accompanying drawings, wherein:—

Figure 1 shows a plan view of the slip, partly in section.

Figure 2 shows a side view thereof, partly in section, as mounted in a rotary table, taken on the line 2—2 of Fig. 1.

Figure 3 shows a plan view of a driving bushing, or adapter, having a slip seat therein.

Figure 4 shows a plan view of the slip.

Figure 5 shows a sectional view taken on the line 5—5 of Figure 4, and

Figure 6 shows a side view, partly in section of a modified form of the slip.

In the drawings the numeral 1 designates the intermediate segment of the slip and the numerals 2, 2 designate the side, or free, segments thereof. On each side the intermediate segment 1 has the mortises 3, 3 to receive the respective tenons 4, 4 which are carried by, and preferably integral with, the segments 2, 2. The outer ends of these tenons are outwardly beveled, as at 5, 5 to provide space whereby the segments 2, 2 may swing outwardly, or into open position. The tenons are secured in place by means of pins, or set screws, 6, 6 on which the tenons pivot.

The outer sides of the slip segments taper downwardly to conform to the shape of, and to fit within the downwardly converging seat 7, of the drive bushing, or adapter, 8 which is seated in the rotary table 9 of the conventional rotary drilling machine; or the slip may be seated in a seat 10 of a casing head 11. The inner sides of the segments may have circumferential teeth 12 to grip the pipe 13 to be held, and also may have vertical teeth 14 to grip said pipe to hold it against turning. The intermediate segment 1 and the tenons 4, 4 have the aligned sockets 15, 15 to receive the ends of the springs 16, 16 whereby the segments of the slip are normally held in closed position.

The segment 1 has an arm 17 extending outwardly from the upper end thereof which is preferably square in cross section and which is provided to fit into the correspondingly shaped socket 18 of the handle 19. This handle may be swung in the derrick by means of the coil springs 20, 20.

Pivoted on the handle is a lever 21 one end of which is formed with a grip 22 and is seated on the coil spring 23, and depending from, and pivoted to the other end of said lever is the dog 24 which works through a bearing 25 of the handle and is adapted to engage with the teeth 26 of said arm 17 whereby the handle may be held against detachment from said arm.

The other segments 2, 2 may have the lateral studs 27, 27, if desired for the attachment of the handles 28, 28, which are detachable therefrom, and by which said other segments may be handled, all as illustrated in Figures 4 and 6.

In each form, at the open side of the slip the segments 2, 2, at the upper ends have the diverging guides 29, 29 which will engage the pipe 13, as the slip is swung into place, whereby the segments 2 will be swung apart and will pass around said pipe and these segments will then swing into place about the pipe under the influence of the springs 16, 16.

The segments, or some of them, may have the external lugs, as 30, adapted to seat in the corresponding recesses, as 31 to hold the slip against turning due to the torsional strain on the pipe in screwing sections onto, or unscrewing the same from, the upper end of the pipe 13.

In the form shown in Figure 6 the slip segments may have aligned inserts 32 incorporated therein and formed of rubber, or other resilient material to form packing against the surrounding seat. These inserts may each have an internal chamber 33 therein with a duct 34 leading downwardly therefrom. In case of strong well pressure the fluid will enter said chambers from the well and force the packing closely against the surrounded pipe as well as against the surrounding seat.

The drawings and description disclose what is now considered to be preferred forms of the invention by way of illustration only while the broad principle of the invention will be defined by the appended claims.

What I claim is:—

1. A slip formed of a series of segments and shaped to surround a pipe, flat, plate-like tenons bridging each joint but one between adjacent segments, each tenon being formed integrally with one segment and projecting into a mortise in the adjacent segment, pivots extending through the tenons and into the segments in contact therewith and a spring housed within said mortise between the free end of each tenon and its corresponding segment.

2. A slip formed of a series of segments and shaped to surround a pipe, tenons bridging each joint but one between adjacent segments, each tenon being formed rigid with one segment and projecting into a mortise in the adjacent segment, pivots extending through the tenons and into the segments in contact therewith, said tenons and pivots forming means for hingedly connecting the segments to permit them to be swung open and closed and the free end of each tenon being beveled outwardly to limit the outward swinging of said segments.

3. A slip formed of a series of segments and shaped to surround a pipe, each segment having a lateral, narrow slot forming a mortise, tenons bridging each joint but one between adjacent segments, each tenon being formed rigid with one segment and projecting into the mortise in the adjacent segment, pivots extending through the tenons and into the segments in contact therewith the free end of each tenon being beveled outwardly to permit said segments to swing open and a spring between said end and the corresponding segment.

4. A slip formed of a series of segments pivotally connected together, said slip being open at one side, an outwardly extended arm on one segment, a handle formed at one end to slip over said arm, means for releasably securing said handle to said arm.

5. A slip formed of a series of segments pivotally connected together, said slip being open at one side, an outwardly extended arm on one segment, a handle formed at one end to slip over said arm, means for releasably securing said handle to said arm and detachable handles attached to the other segments.

6. A slip formed of an intermediate segment having side slots therein forming mortises, side segments having flat plate like tenons integral therewith which project into said respective mortises, pins through said intermediate segment on which said tenons are pivoted, said side segments being swingable outwardly, springs in said mortises which operate against the inner ends of the tenons to resist said outward movement and outwardly flared guides on the free ends of said side segments.

GRANVILLE A. HUMASON.